United States Patent [19] [11] 4,257,935
Sekiguchi et al. [45] Mar. 24, 1981

[54] COLOR DEVELOPING SHEET FOR PRESSURE-SENSITIVE RECORDING SYSTEMS

[75] Inventors: Sadao Sekiguchi, Minoo; Kojiro Matsumoto, Takarazuka; Tetsuo Ishikawa, Ibaraki; Saburo Mishiba; Nobujiro Izaki, both of Niihama, all of Japan

[73] Assignee: Sumitomo Naugatuck Co., Ltd., Osaka, Japan

[21] Appl. No.: 921,014

[22] Filed: Jun. 30, 1978

Related U.S. Application Data

[62] Division of Ser. No. 745,261, Nov. 26, 1976, Pat. No. 4,125,675.

[30] Foreign Application Priority Data

Nov. 28, 1975 [JP] Japan ................................ 50/142498

[51] Int. Cl.[3] ................................ C08L 47/00

[52] U.S. Cl. ......................... 260/29.7 H; 260/29.7 T; 428/307; 428/483; 526/303; 526/304; 526/317; 526/318

[58] Field of Search ................ 260/29.7 UA, 29.7 SE, 260/29.7 E, 29.7 T, 29.7 H; 106/14.5, 21; 428/307, 483; 526/303, 304, 317, 318

[56] References Cited

U.S. PATENT DOCUMENTS

| | | | |
|---|---|---|---|
| 3,164,484 | 1/1965 | Lazzarini | 428/514 |
| 3,297,615 | 1/1967 | Frazier et al. | 428/514 |
| 3,365,410 | 1/1968 | Wesslau et al. | 428/514 |
| 3,385,728 | 5/1968 | Walsh | 260/29.7 E |
| 3,697,323 | 10/1972 | Brown et al. | 428/307 |
| 3,779,800 | 12/1973 | Heiser | 428/515 |
| 3,825,432 | 7/1974 | Futaki et al. | 106/21 |
| 3,955,026 | 5/1976 | Matsukawa et al. | 428/307 |
| 3,966,661 | 6/1976 | Feast et al. | 260/29.7 H |
| 3,970,629 | 6/1976 | Izaki et al. | 260/29.7 T |
| 4,001,163 | 1/1977 | Mather et al. | 260/29.7 T |
| 4,138,522 | 2/1979 | Ishizuka et al. | 428/307 |

OTHER PUBLICATIONS

Hackh's Chemical Dictionary, Fourth Edition, McGraw Hill, 1969, pp. 218& 472.

*Primary Examiner*—Allan Lieberman
*Attorney, Agent, or Firm*—Jones, Tullar & Cooper

[57] ABSTRACT

A color developer sheet sensitized in a color developing property on contact with a chromogenic material and improved in the light-resistance of the developed color, which comprises a support sheet and a coating composition comprising an organic color developer and, as a binder, a latex of a copolymer prepared by polymerization of a mixture essentially consisting of about 20 to 70% by weight of one or more aliphatic conjugated diolefin monomers, about 0.5 to 15% by weight of one or more unsaturated carboxylic acid monomers and about 15 to 79.5% by weight of one or more other olefin monomers copolymerizable with them and having a gel content of about 95 to 100% by weight applied onto a surface of the said support sheet to make a color developer layer.

8 Claims, No Drawings

COLOR DEVELOPING SHEET FOR PRESSURE-SENSITIVE RECORDING SYSTEMS

This is a division of application Ser. No. 745,261, filed Nov. 26, 1976, now U.S. Pat. No. 4,125,675.

The present invention relates to a sheet of recording material, particularly a color developer sheet for pressure-sensitive recording systems, sensitized in the color developing property on contact with a chromogenic material and improved in the light-resistance of the developed color.

Several types of pressure-sensitive recording systems are known utilizing an electron donor-acceptor color-forming reaction between an electron donating colorless chromogenic material (hereinafter referred to as "color former") such as crystal violet lactone, benzoyl leucomethylene blue, malachite green lactone, rhodamine-B-lactam, 3-dialkylamino-7-dialkylaminofluoran and 3-methyl-2,2-spirobi(benzo[f]chromene) and an electron accepting reactant material (hereinafter referred to as "color developer"). One of such recording systems is a transfer-copy system, as disclosed in U.S. Pat. No. 2,730,456, wherein minute oil droplets of a color former dispersed or dissolved in an oil are encapsulated and coated onto a transfer sheet. The color former is thereafter transferred to a copy sheet by rupturing said microcapsules. The underlying copy sheet has a color developer coating thereon containing the color developer reactive with the color former causing a visible colored mark at points where the microcapsules have been ruptured and the color former has been transferred. When multiple copies are desired, one or more middle sheets having a color developer coating on one surface and a coating of encapsulated oil droplets containing a color former on the other surface may be inserted between the transfer sheet and the copy sheet. U.S. Pat. No. 2,730,457 discloses another type of a pressure-sensitive record sheet. In this pressure-sensitive record sheet, there are disposed on one surface of the same sheet both a color developer and the microcapsules containing oil droplets in which a color former is dispersed or dissolved. This record material is known as a "self contained" system.

In those pressure-sensitive recording systems, there have been used as the color developer which can produce a visible color on contact with a color former inorganic materials such as acid clay, active clay, calcined active clay, calcined kaolin, attapulgite bentonite, zeolite, silicates and talc and organic materials such as phenol compounds, phenol resins, maleic acid-rosin resins, partially or wholly hydrolyzed styrene-maleic anhydride copolymers, polyvalent metal salts of phenol resins, aromatic carboxylic acids, polyvalent metal salts of aromatic carboxylic acids, aromatic carboxylic acid-aldehyde polymers, aromatic carboxylic acid-acetylene polymers and polyvalent metal salts of aromatic carboxylic acid-aldehyde polymers. On application of these color developers to the surface of a support sheet such as paper, plastic film or resin-coated paper to make a color developer sheet, there is usually employed together a binder such as starch, casein, gelatine, gum arabic, albumin, tragacanth gum, methylcellulose, ethylcellulose, carboxymethylcellulose, carboxyethylcellulose, hydroxyethylcellulose, polyvinyl alcohol, styrene-butadiene copolymer, vinyl acetate copolymer or acrylic copolymer so as to keep the color developer firmly on the surface of the support sheet.

Recently, among these color developers, organic color developers have become preferably used in particular since they have a relatively good color developing ability, in addition such advantage as getting stable developed color toward moisture. However, the organic color developers having above preferable properties are still unsatisfactory from the standpoint of the stability of the developed color toward light to leave room for improvement.

As the result of the extensive study for overcoming the defects as above, it has now been found that the use of a copolymer latex having a certain specific composition as a binder improves the light-resistance of the developed color. This invention is based on this finding.

A main object of the present invention is to provide an improved color developer sheet for pressure sensitive recording systems having an excellent light-resistance of the developed color. Other objects and advantages of the invention will become apparent from the following descriptions.

According to the present invention, there is provided a color developer sheet which comprises a support sheet and a coating composition comprising an organic color developer and, as a binder, a latex of a copolymer prepared by polymerization of a mixture essentially consisting of about 20 to 70% by weight of one or more aliphatic conjugated diolefin monomers, about 0.5 to 15% by weight of one or more unsaturated carboxylic acid monomers and about 15 to 79.5% by weight of one or more other olefinic group containing monomers copolymerizable with them and having a gel content of about 95 to 100% by weight applied onto a surface of the said support sheet to make a color developer layer.

In the latex, the copolymer is included usually in an amount of about 20 to 60% by weight.

The aliphatic conjugated diolefin monomer may be one having 4 to 10 carbon atoms. Specific examples are 1,3-butadiene, alkyl-substituted butadienes (e.g. 2-methyl-1,3-butadiene, 2,3-dimethyl-1,3-butadiene), halogen-substituted butadienes (e.g. 2-chloro-1,3-butadiene), pentadienes (e.g. 1,3-pentadiene), hexadienes (e.g. 1,5-hexadiene), etc. Among them, particularly preferred is 1,3-butadiene. The amount of the aliphatic conjugated diolefin monomer is from about 20 to 70% by weight based on the total weight of the monomers. When the amount is less than about 20% by weight, the adhesion strength of the latex is low, or the film formation of the latex is insufficient. When the amount is more than about 70% by weight, the improving effect in the light-resistance is reduced. The most preferable amount is usually in the range of about 30 to 49% by weight.

The unsaturated carboxylic acid monomer may be one having not more than 16 carbon atoms such as unsaturated monocarboxylic acids (e.g. acrylic acid, methacrylic acid) and unsaturated dicarboxylic acids and their monoalkyl esters and anhydrides (e.g. maleic acid, fumaric acid, itaconic acid, methyl maleate, ethyl maleate, octyl maleate, isobutyl maleate, lauryl maleate, maleic anhydride, phthalic anhydride). The amount of the unsaturated carboxylic acid monomer is from about 0.5 to 15% by weight. When the amount is less than about 0.5% by weight, the mechanical stability of the latex is lowered. When it exceeds about 15 % by weight, the viscosity of the latex tends to become too large. The most preferable amount is usually in a range of about 1 to 5% by weight.

The other olefinic group containing monomer constitutes the remaining part of the monomers used to produce the copolymer used in the latex. Olefinic group containing monomers useful in the present invention include those monomers having not more than 16 carbon atoms such as aromatic vinylic monomers (e.g. styrene, α-methylstyrene, vinyltoluene, dimethylstyrene), acrylic monomers (e.g. methyl acrylate, ethyl acrylate, butyl acrylate, 2-ethylhexyl acrylate, lauryl acrylate, 2-hydroxyethyl acrylate, 2-hydroxypropyl acrylate, glycidyl acrylate, methyl methacrylate, ethyl methacrylate, 2-hydroxyethyl methacrylate, 2-hydroxypropyl methacrylate, glycidyl methacrylate), unsaturated nitriles (e.g. acrylonitrile, methacrylonitrile), acrylamide or N-methylolacrylamide. Among them, styrene, methyl methacrylate and acrylonitrile are the most preferable.

For increasing the gel content of the copolymer and enhancing the improving effect of the light-resistance of the developed color, the use of monomers having at least two ethylenic unsaturations per each molecule and being able to form a molecular bridged structure with the other olefine group containing monomers is particularly preferred. Examples of such monomers are divinylbenzene, diallyl phthalate, diallyl maleate, triallyl cyanurate, ethylene glycol dimethacrylate, allyl acrylate, p-isopropenylstyrene, etc. The amount of these monomers is preferably from about 5% by weight or less based on the total weight of the monomers, because larger amounts of them tend to reduce the picking strength of the color developer sheet.

The copolymer is characteristic in having a high gel content of about 95 to 100% by weight. Such a high gel content may contribute partly to the remarkable effect of improvement in the light-resistance of the developed color. In case of the gel content being less than about 95%, the light-resistance is lowered. The most preferable range of the gel content is from about 98 to 100% by weight.

Preparation of the copolymer latex may be effected by a per se conventional procedure for emulsion polymerization, for instance, by continuous emulsion polymerization or batchwise emulsion polymerization. The reaction may be carried out in the presence of conventional additives usually employed for emulsion polymerization such as an emulsifier, a chain transfer agent, a polymerization initiator, an electrolyte and a chelating agent. The reaction temperature may be appropriately selected in a wide range from low temperature to high temperature. As to these and other conditions for emulsion polymerization, reference may be made to F. A. Borey et al.: "Emulsion Polymerization", published by Interscience Publishers, Inc. (New York) in May, 1965.

The method or process for production of a color developer sheet for pressure-sensitive recording systems is known. Such known method or process is also applicable to the manufacture of the color developer sheet of the invention. Thus, a conventional organic color developer, a conventional procedure for preparation of a coating composition to make a color developer layer, a conventional operation for application of the coating composition to the surface of a support sheet, etc. may be used or adopted.

Examples of the organic color developer are phenolic compounds, phenol resins such as phenol-aldehyde polymers and phenol-acetylene polymers, maleic acid-rosin resins, partially or wholly hydrolyzed styrene-maleic anhydride copolymers, ethylene-maleic anhydride copolymers and polyvalent metal salts of phenol resins as described in U.S. Pat. Nos. 3,455,721, 3,516,845 and 3,732,120, aromatic carboxylic acids such as benzoic acid, 3-tert.-butyl-4-hydroxybenzoic acid, salicylic acid, 5-cyclohexylsalicylic acid, 3-methyl-5-tert.-octylsalicylic acid, 3-phenyl-5-(α,α-dimethylbenzyl)salicylic acid, 3,5-di(α,α-dimethylbenzyl)-salicyclic acid, 3,5-di(α-methylbenzyl)salicylic acid, 4-methyl-5-cyclohexylsalicylic acid, 3-(α,α-dimethylbenzyl)-6-phenylsalicylic acid, 3,6-dicyclohexyl-5-hydroxysalicylic acid, 1-hydroxy-2-carboxynaphthalene, 1-hydroxy-2-carboxy-4,7-di(α-methylbenzyl)naphthalene and 3-tert.-butyl-5-(3′,5′-di-tert.-butyl-4-hydroxybenzyl)salicylic acid, and their salts of polyvalent metals (e.g. zinc, magnesium, aluminum, calcium, titanium, manganese, nickel, cobalt, iron, tin, chromium, copper, vanadium) as described in U.S. Pat. No. 3,864,146 and British Pat. Nos. 1,329,065 and 1,392,946, aromatic carboxylic acid-aldehyde copolymers and aromatic carboxylic acid-acetylene polymers, and their polyvalent metal salts as described in U.S. Pat. Nos. 3,767,449 and 3,772,052, etc. Particularly preferred are phenol resins and their polyvalent metal salts, aromatic carboxylic acids and their polyvalent metal salts, and aromatic carboxylic acid-aldehyde copolymers and aromatic carboxylic acid-acetylene polymers and their polyvalent metal salts.

The copolymer latex of the invention which brings about a notable effect of improvement to organic color developers does not afford any unfavorable influence to inorganic color developers (e.g. active clay, acid clay, attapulgite, bentonite, zeolite, silicate, talc, kaolin), metal oxides (e.g. zinc oxide, titanium oxide, magnesium oxide), metal hydroxides (e.g. zinc hydroxide, magnesium hydroxide), metal carbonates (e.g. magnesium carbonate, calcium carbonate) and pigments (e.g. magnesium sulfate, calcium sulfate). Therefore, one or more of these inorganic materials may be used together with the organic color developer in order to improve the color developing property, enhance the printability and reduce the production cost. When the inorganic material is used, its amount may be from about 0.05 to 100 parts by weight, preferably from about 0.5 to 40 parts by weight, to 1 part by weight of the organic color developer.

In preparation of a coating composition to make a color developer layer, the organic color developer may be dispersed in an appropriate liquid medium, followed by incorporating the copolymer latex into the resulting dispersion. The content of the organic color developer in the coating composition may be usually from about 0.5 to 97% by weight, preferably from about 1.5 to 80% by weight based on the weight of the solid components in such composition. As the liquid medium, there may be used water and/or any organic solvent compatible with the copolymer latex (e.g., methanol, ethanol, isopropanol, ethylene glycol, propylene glycol). Any additive conventionally employed for the preparation of a coating composition to make a color developer layer such as a dispersing agent, an antifoaming agent or a surfactant is also utilizable. The amount of the copolymer latex to be used may be varied with the improving effect to the organic color developer, the adhesive strength, the production cost and the like and is usually from about 3 to 33% by weight as solids on the basis of the total weight of the solid components in the coating composition. When desired, any conventional binder may be co-used insofar as it does not prevent the exertion of the improving effect of the copolymer latex. The amount of such conventional binder is usually not more than about 9 parts by weight, preferably not more than about 2 parts by weight, as solids per 1 part by weight of the solids in the copolymer latex.

The application of the thus prepared coating composition onto the surface of a support sheet may be carried out by a conventional procedure, for instance, by the aid of a coating means such as air knife, rolls, blades or sizing press. The application may be also effected by any other process such as printing using a printing press (e.g. letter press, flexography). The amount of the coating composition to be applied is usually from about 0.3 to 15 $g/m^2$, preferably from about 0.5 to 10 $g/m^2$, as a dry weight.

Practical and presently preferred embodiments of the invention are illustratively shown in the following Examples wherein parts and % are by weight unless otherwise indicated.

EXAMPLE 1

To a mixture of the materials as shown in Table 1, sodium alkylbenzenesulfonate (mainly consisting of dodecylbenzene sulfonate) (1.3 parts), sodium hydrogencarbonate (0.7 part), potassium persulfate (1.0 part) and water (100 parts) are added, and the resultant mixture is subjected to polymerization at 70° C. for 18 hours in an autoclave in which the atmosphere has been replaced by nitrogen gas. After completion of the polymerization, the pH value of the reaction mixture is adjusted by the addition of sodium hydroxide to obtain a copolymer latex.

The gel content of the copolymer and the average particle size of the copolymer latex are shown in Table 1. Determination of the gel content is carried out by the following procedure: drying the copolymer latex in the air for 2 days to obtain a film, immersing the obtained film into an approximately 400 times (by weight) amount of benzene, leaving it as such for 2 days under occasional stirring, measuring the amount of the material dissolved in benzene and calculating out the amount of the gel portion being not dissolved.

TABLE 1

| Material (part) | Copolymer Latex No.(*) 1 | 2 | 3 | 4 | 5 | 6 | 7 | A | B |
|---|---|---|---|---|---|---|---|---|---|
| Butadiene | 35 | 35 | 35 | 33 | 35 | 30 | 48 | 35 | |
| Styrene | 57.5 | 56.5 | 55 | 56 | 56.5 | 61.5 | 43 | 57.5 | |
| Acrylic acid | 1.5 | 1.5 | 1.5 | 1.0 | 1.5 | 1.0 | 1.5 | 1.5 | |
| Fumaric acid | 1.5 | 1.5 | 1.5 | 2.0 | 1.5 | 2.0 | 1.5 | 1.5 | |
| Methyl methacrylate | 4.5 | 4.5 | 5.0 | 4.0 | 4.5 | 4.5 | 5.0 | 4.5 | |
| Divinylbenzene | — | 1.0 | 2.0 | 4.0 | — | 1.0 | 1.0 | — | |
| Ethylene glycol dimethacrylate | — | — | — | — | 1.0 | — | — | — | |
| Dodecylmercaptan | — | — | — | — | — | — | — | 0.3 | |
| Average particle size (μ) | 0.15 | 0.16 | 0.16 | 0.18 | 0.16 | 0.16 | 0.16 | 0.16 | 0.16 |
| Gel content (%) | 95.5 | 99.7 | 100 | 100 | 99.2 | 99.6 | 99.7 | 85.3 | 83.3 |

(*)Copolymer Latex Nos. 1 to 7 are within the scope of the invention. Copolymer Latex No. A is for comparison. Copolymer Latex No. B is a commercially available styrene-butadiene copolymer latex.

Using each of the copolymer latexes prepared as above, a coating composition containing a color developer is prepared according to the following formulation, and the obtained coating composition is applied to one surface of wood free paper (65 $g/m^2$) in an amount of 5 $g/m^2$ on dry basis to obtain a copy sheet:

| Formulation Material | Part(s) |
|---|---|
| Zinc salicylate | 10 |
| Active clay | 90 |
| Sodium polyacrylate | 0.6 (as solids) |
| Oxidized starch | 2 (as solids) |
| Copolymer latex | 15 (as solids) |
| Water in an amount required for obtaining a solid content of 30% | |

The quality of the thus prepared copy sheet is evaluated by the following test. Namely, a commercially available transfer sheet having a coating layer of encapsulated droplets of an alkylnaphthalene solution of crystal violet lactone is placed onto the coated surface of the copy sheet so as to make the coating layer of the transfer sheet in contact with the coated surface of the copy paper, and a load of 107 $kg/cm^2$ is charged thereto, whereby the capsules are ruptured and the crystal violet lactone is transferred to the copy sheet. After allowed to stand for 1 hour in a dark place, the color density of the colored part is measured by the aid of a Macbeth color densitometer to obtain an initial color density. Further, the color density of the colored part is measured after exposure of the sunlight for 1 or 2 days, and the value of the light-resistance is calculated according to the following equation:

$$^{a}\text{Light-resistance} = \frac{\text{Color density after exposure to sunlight}}{\text{Initial color density}} \times 100(\%)$$

The results are shown in Table 2.

TABLE 2

| Copy Sheet No.* | 1 | 2 | 3 | 4 | 5 | 6 | 7 | A | B |
|---|---|---|---|---|---|---|---|---|---|
| Initial color density | 0.78 | 0.80 | 0.86 | 0.87 | 0.78 | 0.81 | 0.81 | 0.75 | 0.75 |
| Light-resistance after 1 day (%) | 41 | 65 | 73.5 | 79.2 | 54.8 | 66.4 | 64.0 | 25.3 | 27.0 |
| Light-resistance after 2 days (%) | 29 | 53 | 59.4 | 71.6 | 45.0 | 56.7 | 51.2 | 20.0 | 22.0 |

*Copy Sheet No. corresponds to Copolymer Latex No. in Table 1.

From Table 2 it is obvious that notable improvement in the light-resistance of the developed color is attained in the copy sheet of the invention.

EXAMPLE 2

Water (200 parts), zinc 3,5-di(α,α-dimethylbenzyl)-salicylate (100 parts) and sodium polyacrylate (solid component, 20%) (3 parts) are mixed well by the aid of a sand grinder to make a dispersion. Then, water (100 parts) and the copolymer latex prepared as in Example 1 (15 parts as solids) are added thereto to prepare a coating composition. Using the thus obtained coating composition, a copy sheet is prepared as in Example 1, and its quality is evaluated by the test as mentioned in Example 1.

The results are shown in Table 3.

TABLE 3

| Copy Sheet No.* | 1 | 2 | 3 | 4 | 5 | 6 | 7 | A | B |
|---|---|---|---|---|---|---|---|---|---|
| Initial color density | 0.76 | 0.79 | 0.82 | 0.85 | 0.86 | 0.83 | 0.78 | 0.75 | 0.75 |
| Light-resistance after 1 day (%) | 43 | 62.5 | 75.8 | 78.4 | 56.2 | 67.2 | 61.5 | 25.3 | 27.0 |
| Light-resistance after 2 days (%) | 43.3 | 55 | 58.1 | 72.6 | 46.6 | 58.6 | 53.4 | 20.0 | 22.0 |

*Copy Sheet No. corresponds to Copolymer Latex No. in Table 1.

EXAMPLE 3

As in Example 2, a copy sheet is prepared according to the following formulation:

Formulation

| Material | Part(s) | |
|---|---|---|
| Active clay | 90 | |
| Phenol resin (p-Phenylphenol-aldehyde polycondensation product) | 10 | |
| Sodium hexamethaphosphate | 1 | |
| NaOH | 0.8 | |
| Oxidized starch | 5 | (as solids) |
| Copolymer latex | 15 | (as solids) |
| Water in an amount required for obtaining a solid content of 30% | | |

The resulting copy sheet exhibits improved light-resistance.

EXAMPLE 4

To a mixture of the materials as shown in Table 4, sodium alkylbenzenesulfonate (1.3 parts), sodium hydrogencarbonate (0.7 part), potassium persulfate (1.0 part) and water (100 parts) are added, and the resultant mixture is subjected to polymerization at 70° C. for 18 hours in an autoclave in which the atmosphere has been replaced by nitrogen gas. After completion of the polymerization, the pH value of the reaction mixture is adjusted by the addition of sodium hydroxide to obtain a copolymer latex.

The gel content of the copolymer and the average particle size of the copolymer latex are shown in Table 4.

TABLE 4

| Material (part) | Copolymer Latex No.(*) 8 | 9 | 10 | 11 | 12 | 13 | C | D |
|---|---|---|---|---|---|---|---|---|
| Butadiene | 35 | 35 | 35 | 35 | 35 | 35 | 35 | |
| Styrene | 56.5 | 56.5 | 58.5 | 60.0 | — | 50 | 57.5 | |
| Acrylonitrile | — | — | — | — | — | 10 | — | |
| Acrylic acid | 1.5 | 1.5 | 3.0 | 1.5 | 1.0 | 1.5 | 1.5 | |
| Itaconic acid | 0.5 | 1.5 | 1.0 | 0.5 | — | 1.5 | 1.5 | |
| Methyl methacrylate | 4.5 | 4.5 | — | — | 63 | — | 4.5 | |
| Glycidyl methacrylate | — | — | — | 2.0 | — | — | — | |
| Hydroxyethyl acrylate | 1.0 | — | 2.0 | — | — | 1.0 | — | |
| Divinylbenzene | 1.0 | 1.0 | 0.5 | 1.0 | 1.0 | 1.0 | — | |
| Dodecylmercaptan | 0.2 | 0.4 | — | 0.2 | — | — | 0.3 | |
| Average particle size (μ) | 0.14 | 0.13 | 0.18 | 0.16 | 0.16 | 0.16 | 0.16 | 0.16 |
| Gel content (%) | 98.0 | 97.5 | 99.4 | 99.7 | 99.0 | 99.3 | 85.3 | 70.1 |

(*)Copolymer Latex Nos. 8 to 13 are within the scope of the invention. Copolymer Latex No. C is for comparison. Copolymer Latex No. D is a commercially available styrene-butadiene copolymer latex.

Using each of the copolymer latexes prepared as above, a coating composition containing a color developer is prepared by the following procedure: dissolving a dispersing agent ("Demol N" manufactured by Kao Atlas Co., Ltd.) (1 part) into water (150 parts), adding zinc 3-phenylsalicylate (15 parts), zinc oxide (10 parts) and active clay (75 parts) to the solution under stirring and adding thereto a 10% solution of oxidized starch (30 parts), the copolymer latex as shown in Table 4 (10 parts as solids) and a carboxyl-modified styrene-butadiene copolymer latex ("SN-304 K" manufactured by Sumitomo Naugatuck Co., Ltd.: gel content, 86%) (5 parts as solids) under stirring. The thus obtained coating composition is applied to one surface of wood free paper (65 g/m$^2$) in an amount of 5 g/m$^2$ on dry basis to obtain a copy sheet, whose quality is then evaluated by the same procedure as in Example 1. The results are shown in Table 5.

TABLE 5

| Copy Sheet No.* | 8 | 9 | 10 | 11 | 12 | 13 | C | D |
|---|---|---|---|---|---|---|---|---|
| Initial color density | 0.90 | 0.90 | 0.88 | 0.90 | 0.88 | 0.85 | 0.88 | 0.88 |
| Light-resistance after 1 day (%) | 62.1 | 51.6 | 61.2 | 61.3 | 66 | 66.8 | 23.4 | 24.7 |
| Light-resistance | 49.5 | 44.2 | 58.1 | 51.2 | 50 | 53.3 | 21.5 | 23.1 |

TABLE 5-continued

| Copy Sheet No.* | 8 | 9 | 10 | 11 | 12 | 13 | C | D |
|---|---|---|---|---|---|---|---|---|
| after 2 days (%) | | | | | | | | |

*Copy Sheet No. corresponds to Copolymer Latex No. in Table 4.

EXAMPLE 5

Using each of Copolymer Latex Nos. 4 and A as prepared in Example 1, a coating composition containing a color developer is prepared according to the following formulation:

Formulation

| Material | Part(s) |
|---|---|
| Zinc 3,5-di (α,α-dimethylbenzyl)salicylate | 4 |
| Zinc oxide | 20 |
| Aluminum hydroxide | 60 |
| Titanium oxide | 16 |
| Sodium polyacrylate | 0.6 (as solids) |
| Oxidized starch | 10 (as solids) |
| Copolymer Latex No. 4 or A | 5 (as solids) |
| Water in an amount required for obtaining a solid content of 30% | |

The thus obtained coating composition is applied to the surface of the layer coated with microcapsules of the same transfer sheet as used in Example 1 in an amount of 5 $g/m^2$ on dry basis to obtain a self-contained sheet, which is then color-developed under a charge of 107 $kg/m^2$ to evaluate its quality by the same procedure as in Example 1. The results are shown in Table 6.

TABLE 6

| Copy Sheet No.* | 4 | A |
|---|---|---|
| Initial color density | 0.80 | 0.75 |
| Light-resistance after 1 day (%) | 64.5 | 25.5 |
| Light-resistance after 2 days (%) | 52 | 21 |

*Copy Sheet No. corresponds to Copolymer Latex No.

What is claimed is:

1. A coating composition for formation of a color developer layer in preparation of a color developer sheet sensitized in a color developing property on contact with a chromogenic material, which comprises an organic color developer and, as a binder, a latex of a copolymer having a solid content of from about 20 to 60% by weight prepared by polymerization of a mixture consisting essentially of about 20 to 70% by weight of at least one aliphatic conjugated diolefin monomer having 4 to 10 carbon atoms optionally substituted with halogen, about 0.5 to 15% by weight of at least one unsaturated carboxylic acid monomer having not more than 16 carbon atoms and about 15 to 79.5% by weight of at least one copolymerizable olefinic group containing monomer having not more than 16 carbon atoms said copolymer having a gel content of about 95 to 100% by weight.

2. The coating composition according to claim 1, wherein the copolymer gel content is from about 98 to 100% by weight.

3. The coating composition according to claim 1, wherein a monomer having at least two ethylenic unsaturated bonds per molecule is used as a part of the at least one olefinic group containing monomer in an amount of not more than about 5% by weight based on the total weight of all of the monomers used to form the copolymer in the latex.

4. The coating composition, as in claim 1, wherein the binder is a latex of a copolymer prepared by polymerization of a mixture consisting essentially of about 30 to 49% by weight of at least one aliphatic conjugated diolefin monomer having 4 to 10 carbon atoms, about 0.5 to 15% by weight of at least one unsaturated carboxylic acid monomer, and about 36 to 69.5% by weight of at least one copolymerizable olefinic group containing monomer, said copolymer having a gel content of about 95 to 100% by weight.

5. The coating composition according to claim 4, wherein the copolymer gel content is from about 98 to 100% by weight.

6. The coating composition according to claim 4, wherein the other olefinic group containing monomer is one selected from the group consisting of aromatic vinylic monomers, acrylic monomers, unsaturated nitriles, acrylamide and N-methylolacrylamide.

7. The coating composition according to claim 4, wherein a monomer having at least two ethylenic unsaturated bonds per each molecule is used as a part of the at least one olefinic group containing monomer in an amount of not more than about 5% by weight based on the total weight of all of the monomers used to form the copolymer in the latex.

8. The coating composition, as in claim 1, wherein the binder is a latex of a copolymer prepared by polymerization of a mixture consisting essentially of about 30 to 49% by weight of 1,3-butadiene, about 1 to 5% by weight of at least one unsaturated carboxylic acid and about 46 to 69% by weight of at least one monomer selected from the group consisting of styrene, methyl methacrylate and acrylonitrile, said copolymer having a gel content of about 98 to 100% by weight.

* * * * *